(12) United States Patent
Anzue et al.

(10) Patent No.: US 10,198,622 B2
(45) Date of Patent: Feb. 5, 2019

(54) ELECTRONIC MIRROR DEVICE

(71) Applicant: Panasonic Intellectual Property Management Co., Ltd., Osaka (JP)

(72) Inventors: Naomi Anzue, Osaka (JP); Norihiro Imamura, Osaka (JP); Michihiro Yamagata, Osaka (JP); Yoshimitsu Noguchi, Gifu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 624 days.

(21) Appl. No.: 14/403,235

(22) PCT Filed: Mar. 26, 2014

(86) PCT No.: PCT/JP2014/001737
§ 371 (c)(1),
(2) Date: Nov. 24, 2014

(87) PCT Pub. No.: WO2014/156146
PCT Pub. Date: Oct. 2, 2014

(65) Prior Publication Data
US 2015/0154439 A1 Jun. 4, 2015

(30) Foreign Application Priority Data

Mar. 29, 2013 (JP) ................. 2013-071744

(51) Int. Cl.
G06K 9/00 (2006.01)
H04N 7/18 (2006.01)
H04N 5/225 (2006.01)

(52) U.S. Cl.
CPC ......... *G06K 9/00248* (2013.01); *H04N 5/225* (2013.01); *H04N 7/18* (2013.01); *H04N 7/183* (2013.01)

(58) Field of Classification Search
None
See application file for complete search history.

(56) References Cited

U.S. PATENT DOCUMENTS

| 2007/0040033 A1* | 2/2007 | Rosenberg | A47G 1/02 235/462.36 |
| 2008/0151045 A1* | 6/2008 | Kida | G06F 3/017 348/61 |
| 2010/0296802 A1* | 11/2010 | Davies | G03B 17/00 396/77 |

(Continued)

FOREIGN PATENT DOCUMENTS

| GB | 2 281 838 A | 3/1995 |
| JP | 2000-138926 A | 5/2000 |

(Continued)

OTHER PUBLICATIONS

International Search Report for corresponding International Application No. PCT/JP2014/001737 dated Jul. 1, 2014.

(Continued)

*Primary Examiner* — Thai Q Tran
*Assistant Examiner* — Christopher Braniff
(74) *Attorney, Agent, or Firm* — Renner Otto Boisselle & Sklar, LLP

(57) ABSTRACT

An electronic mirror device 100 according to an aspect of the present disclosure displays a user's facial mirror image, and can shift, according to the user's facial orientation or line of sight, the location where the facial image is displayed to a location where he or she can view his or her own facial image easily. The electronic mirror device 100 according to an aspect of the present disclosure includes an image capturing section 102 which captures the user's facial image, an image data generating section 120 which outputs image data representing the user's facial mirror image based on image data representing the user's facial image that has been captured, a display section 103 which displays the image data representing the user's facial mirror image, and a (Continued)

display location shifting section 130 which shifts a location where the mirror image is displayed on the display section.

10 Claims, 16 Drawing Sheets

(56) References Cited

U.S. PATENT DOCUMENTS

| | | | |
|---|---|---|---|
| 2011/0210970 A1 | 9/2011 | Segawa | |
| 2012/0044364 A1* | 2/2012 | An | H04N 7/183 348/207.1 |
| 2012/0269405 A1* | 10/2012 | Kaneda | G06K 9/00604 382/118 |
| 2013/0128364 A1* | 5/2013 | Wheeler | A61B 3/113 359/630 |
| 2013/0258190 A1* | 10/2013 | Sawada | H04N 5/7416 348/383 |

FOREIGN PATENT DOCUMENTS

| | | |
|---|---|---|
| JP | 2002-290964 A | 10/2002 |
| JP | 2004-297733 A | 10/2004 |
| JP | 2004-297734 A | 10/2004 |
| JP | 2005-005791 A | 1/2005 |
| JP | 2008-277983 A | 11/2008 |
| JP | 3154529 U | 9/2009 |
| JP | 2011-240813 A | 12/2011 |
| JP | 2012-060547 A | 3/2012 |
| WO | WO 2009/153975 A1 | 12/2009 |

OTHER PUBLICATIONS

Form PCT/ISA/237 for corresponding International Application No. PCT/JP2014/001737 dated Jul. 1, 2014 and partial English translation.

* cited by examiner

FIG.3
(a)
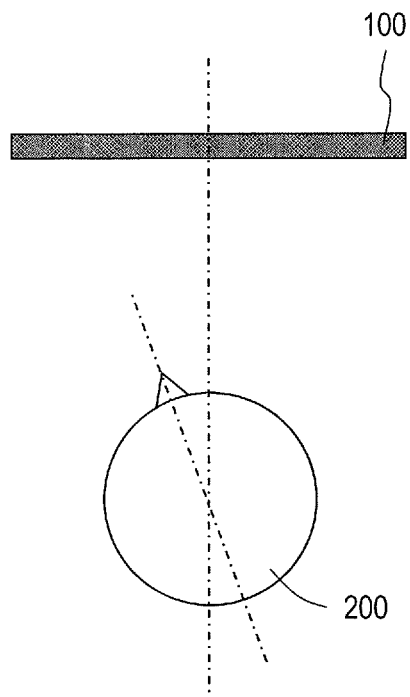
(b)
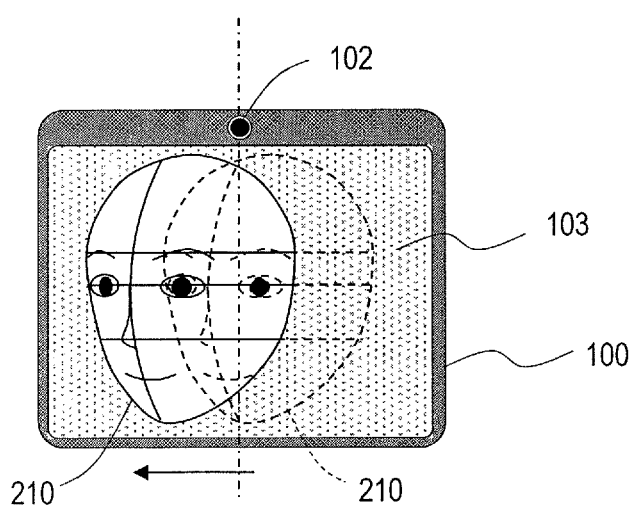

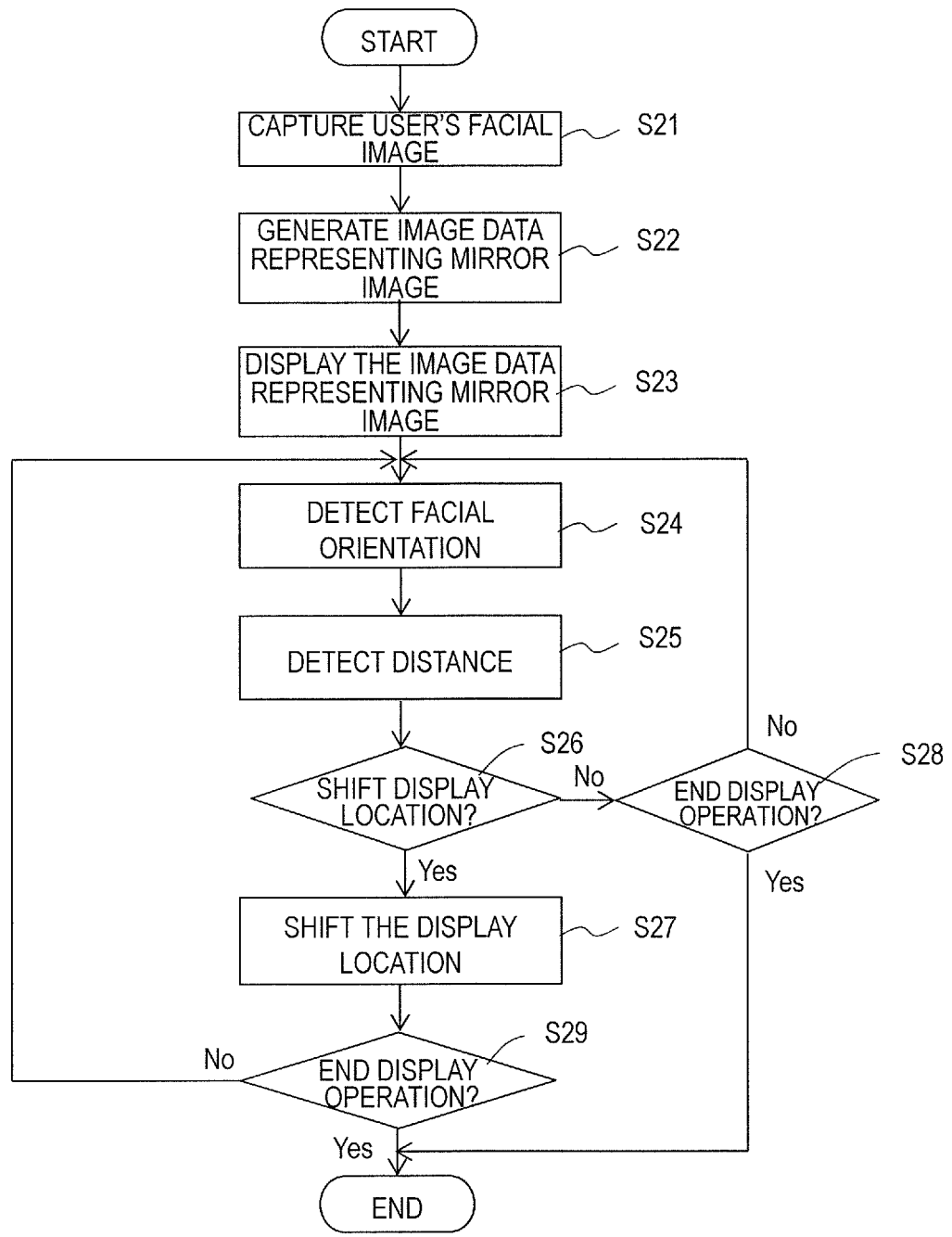

FIG.10
(a)
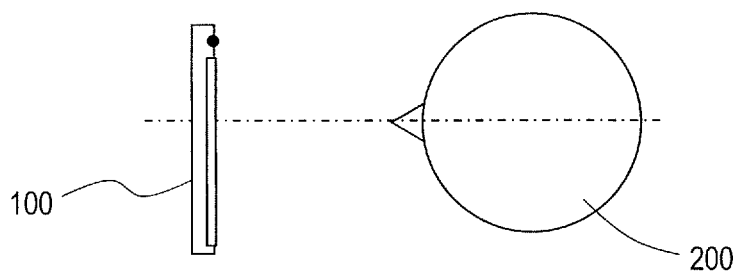
(b)
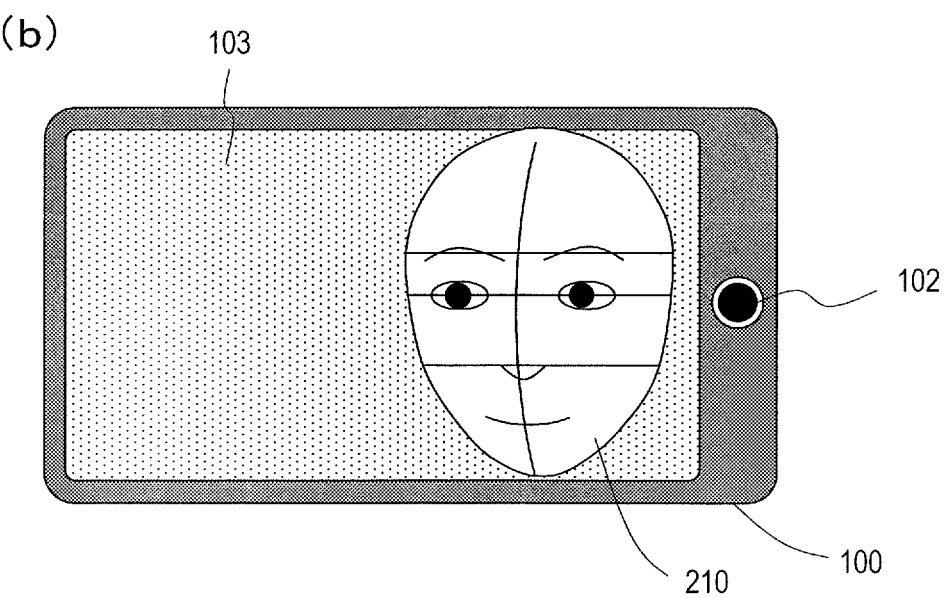

FIG.12
(a) 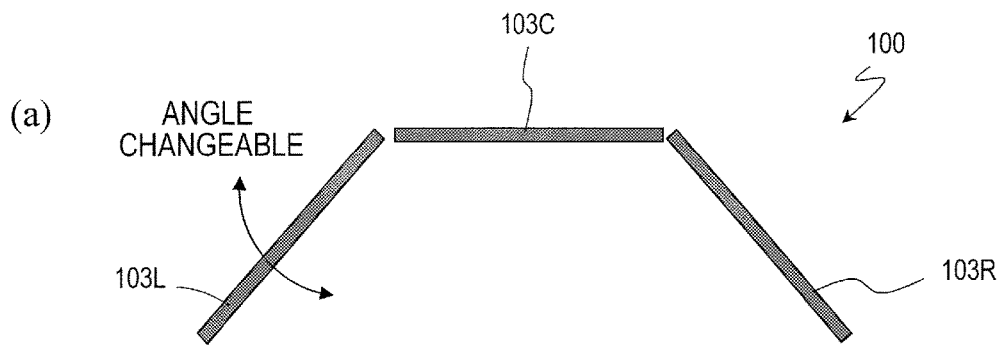
(b) 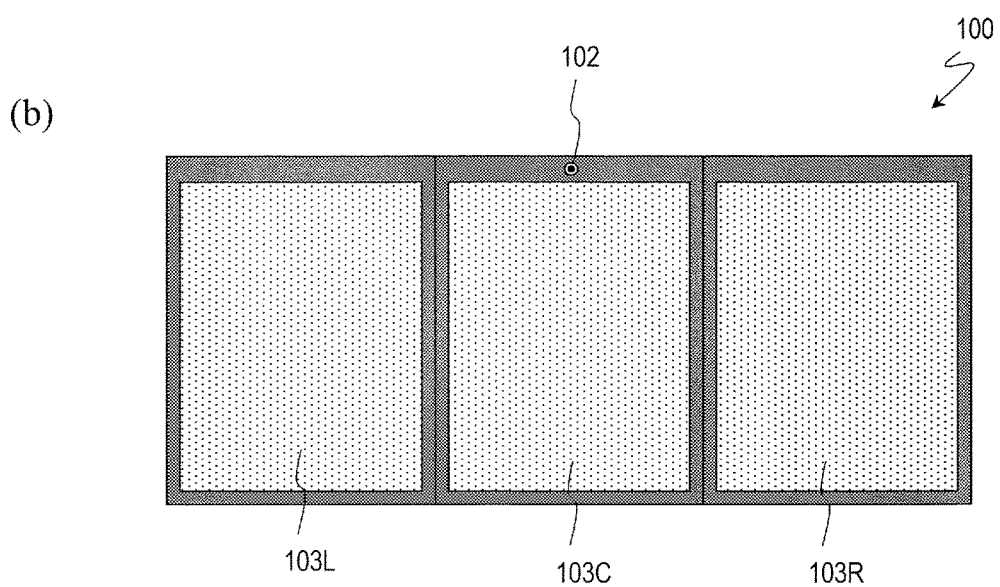

FIG.15
(a)
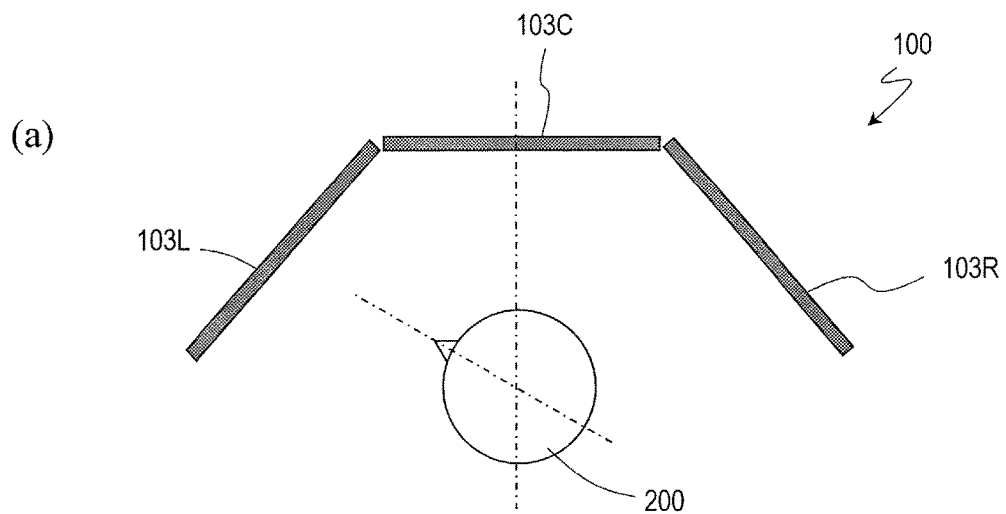
(b)
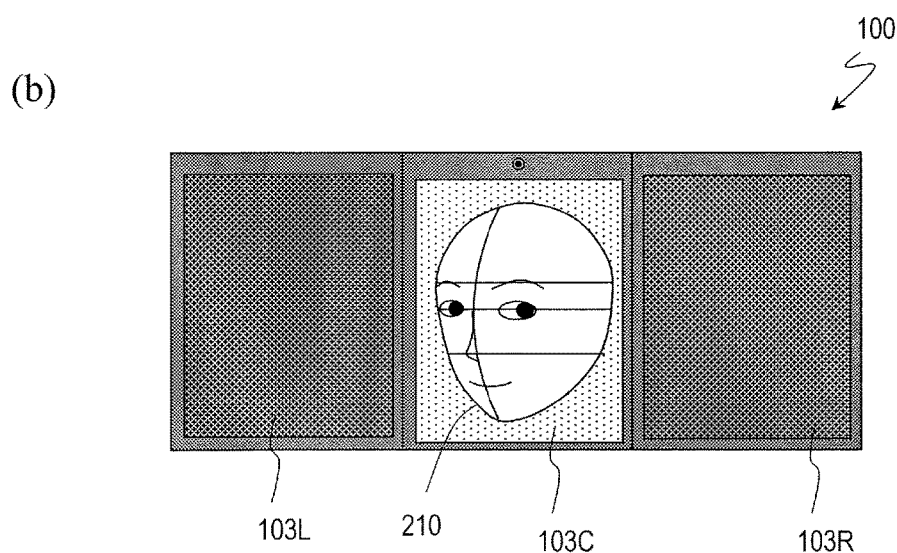

ELECTRONIC MIRROR DEVICE

TECHNICAL FIELD

The present disclosure relates to an electronic mirror device.

BACKGROUND ART

A so-called "electronic mirror" which displays, on a display screen, an image that has been captured with a camera and which can be used as a mirror has been developed and some people propose that such a mirror be used as an application for a mobile telecommunications device (see Patent Document No. 1, for example). Also, as disclosed in Patent Document No. 2, if the position of the camera can be changed, then the user can also use it as a rear-view mirror. Thus, the electronic mirror can perform a different function from a normal mirror which just reflects light.

However, the electronic mirror cannot be used in exactly the same way as a normal mirror, which makes the user feel somewhat uncomfortable especially when the camera is not level with his or her eyes (i.e., his or her line of sight is not aligned with the camera), which is one of problems with the electronic mirror. Thus, to overcome such a problem, Patent Document No. 3 proposes a method for synthesizing together images which have been shot with a plurality of cameras. Patent Document No. 4 proposes a method in which an image capturing section is arranged right behind a display section, thereby turning ON and OFF the display and image capturing sections synchronously with each other. And Patent Document No. 5 proposes a mechanism for changing the position of the camera. Meanwhile, although it does not relate to the field of electronic mirrors, Patent Document No. 6 proposes a technique for aligning the line of sight with the position of an image by detecting the line of sight of a car driver and shifting the location where an image is displayed.

CITATION LIST

Patent Literature

Patent Document No. 1: Japanese Utility Model Publication No. 3154529
Patent Document No. 2: Japanese Laid-Open Patent Publication No. 2000-138926
Patent Document No. 3: Japanese Laid-Open Patent Publication No. 2002-290964
Patent Document No. 4: Japanese Laid-Open Patent Publication No. 2004-297733
Patent Document No. 5: Japanese Laid-Open Patent Publication No. 2012-60547
Patent Document No. 6: Japanese Laid-Open Patent Publication No. 2011-240813

SUMMARY OF INVENTION

Technical Problem

The present disclosure provides an electronic mirror device which allows the user to view image data on the screen more easily by taking advantage of the fact that an electronic mirror works differently from, and cannot be used in the same way as, a normal mirror.

Solution to Problem

An electronic mirror device according to an aspect of the present disclosure displays a user's facial mirror image, and includes: an image capturing section which captures the user's facial image; an image data generating section which outputs image data representing the user's facial mirror image based on image data representing the user's facial image that has been captured; a display section which displays the image data representing the user's facial mirror image; and a display location shifting section which shifts a location where the mirror image is displayed on the display section.

Advantageous Effects of Invention

An electronic mirror device according to an aspect of the present disclosure can shift an image display location to a location where the user can view the image easily, thus allowing the user to look at easily even a facial part (such as his or her profile or a part under his or her chin) which is usually hard to see in a normal mirror.

BRIEF DESCRIPTION OF DRAWINGS

FIGS. 3 (a) and (b) illustrate how an electronic mirror device works according to an embodiment.
FIG. 5B A flowchart showing how an electronic mirror device according to another embodiment operates.
FIGS. 10 (a) and (b) illustrate how an electronic mirror device works according to an embodiment.
FIGS. 12 (a) and (b) illustrate how an electronic mirror device works according to an embodiment.
FIGS. 15 (a) and (b) illustrate how an electronic mirror device works according to an embodiment.

DESCRIPTION OF EMBODIMENTS

Figure 1:
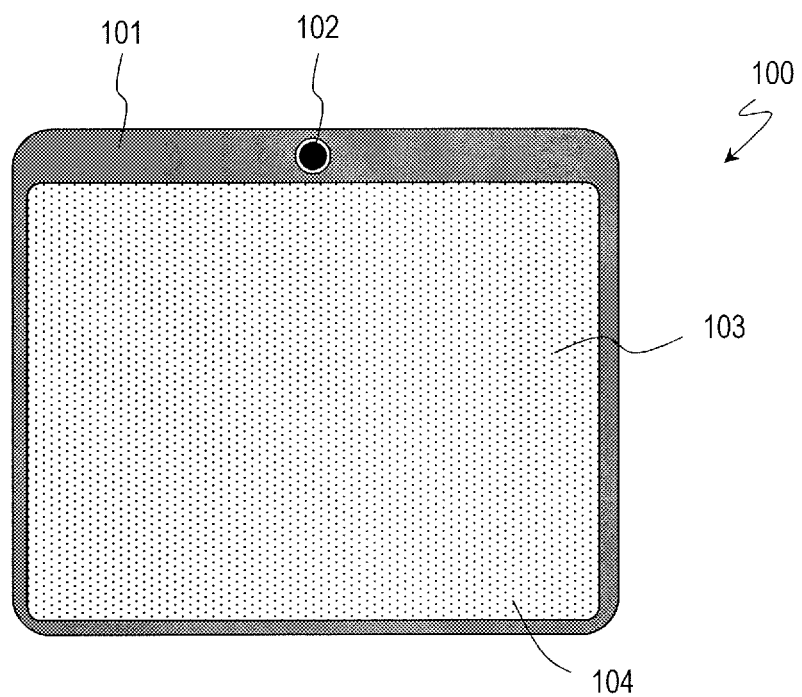
FIG. 1 Illustrates an electronic mirror device as an embodiment.

An aspect of the present disclosure can be outlined as follows:

An electronic mirror device according to an aspect of the present disclosure displays a user's facial mirror image, and includes: an image capturing section which captures the user's facial image; an image data generating section which outputs image data representing the user's facial mirror image based on image data representing the user's facial image that has been captured; a display section which displays the image data representing the user's facial mirror image; and a display location shifting section which shifts a location where the mirror image is displayed on the display section.

The electronic mirror device may further include a user interface which accepts the user's instruction to shift the location where the mirror image is displayed. The display location shifting section may shift the location where the mirror image is displayed in accordance with the user's instruction.

For example, the electronic mirror device may further include an orientation estimating section which estimates the user's facial orientation. The display location shifting section may shift the location where the mirror image is displayed according to the facial orientation that has been estimated.

For example, the electronic mirror device may further include a facial feature detecting section which detects the location and distribution of a predetermined facial part of the image data representing the user's facial image. The orientation estimating section may estimate the user's facial orientation based on the location and distribution of the predetermined facial part that has been detected.

For example, the electronic mirror device may further include a distance estimating section which estimates a distance from the display section to the user's face. The display location shifting section may shift the location where the mirror image is displayed according to the facial orientation and distance that have been estimated.

For example, the electronic mirror device may further include a line of sight detecting section which detects the direction of the user's line of sight. The display location shifting section may shift the location where the mirror image is displayed to a location to which the user directs his or her line of sight.

For example, the image capturing section and the display section may form integral parts of the device.

For example, before the display location shifting section shifts the location where the mirror image is displayed, the image data may be displayed closer to the image capturing section than to a central area of the display section.

For example, the electronic mirror device may include a plurality of the display sections. The display location shifting section may shift the location where the mirror image is displayed from one of the plurality of display section to another.

A computer program according to an aspect of the present disclosure is defined to make an electronic device perform the operation of displaying a user's facial mirror image which includes the steps of: capturing the user's facial image; outputting image data representing the user's facial mirror image based on image data representing the user's facial image that has been captured; displaying the image data representing the user's facial mirror image; and shifting a location where the mirror image is displayed.

Embodiments of an electronic mirror device will now be described with reference to the accompanying drawings.

(Embodiment 1)

FIG. 1 illustrates an electronic mirror device 100 as a first embodiment. This electronic mirror device 100 displays a user's facial mirror image, and includes a housing 101, an image capturing section 102, a display section 103 which displays an image that has been captured by the image capturing section 102, and a touchscreen panel 104 which accepts the user's touch manipulation. The touchscreen panel 104 is a kind of user interface which accepts various instructions given by the user such as an instruction to shift the location where the image is displayed. In this example, the image capturing section 102, display section 103 and touchscreen panel 104 are housed in the same housing 101 and form integral parts of this electronic mirror device.

Figure 2:
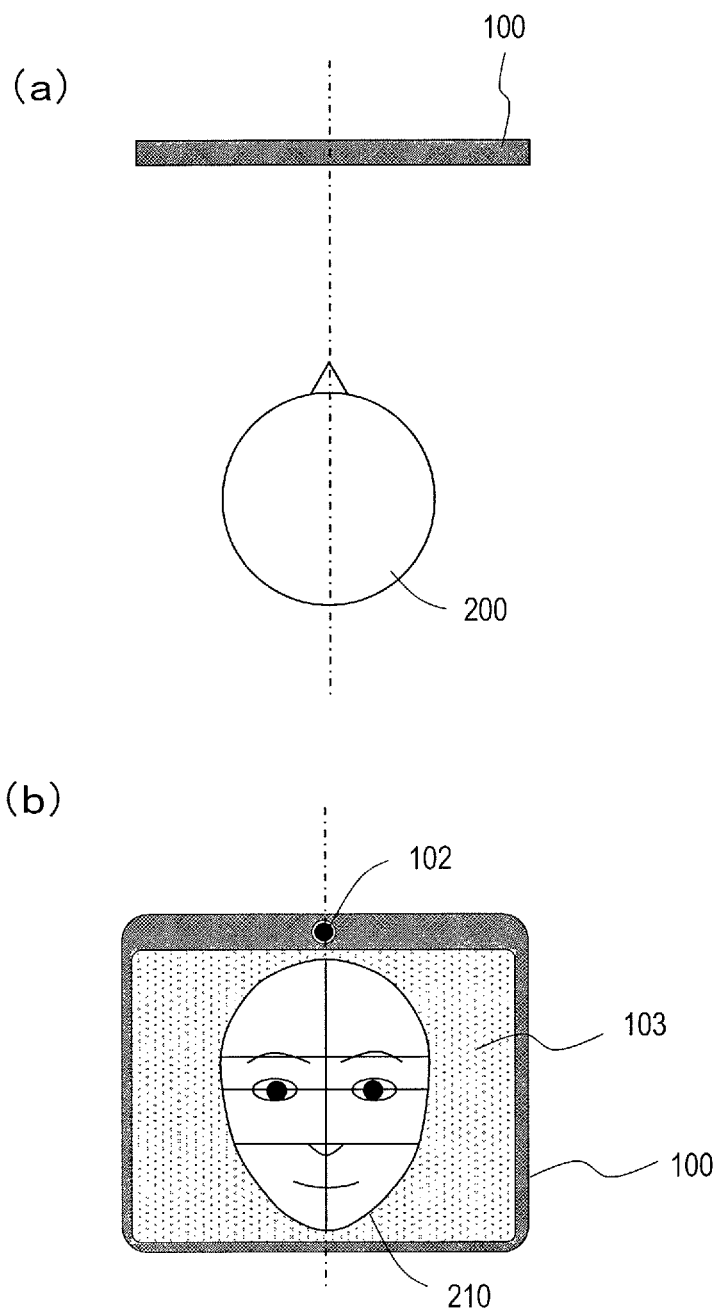
FIGS. 2 (a) and (b) illustrate how an electronic mirror device works according to an embodiment.

Next, it will be described with reference to FIGS. 2 and 3 how this electronic mirror device 100 works. FIGS. 2(a) and 3(a) show relative positions of the electronic mirror device 100 and a user 200 as viewed from over them. On the other hand, FIGS. 2(b) and 3(b) each illustrate a facial image 210 to be displayed on the electronic mirror device 100 when they are located at those relative positions. If the user 200 is facing squarely toward the electronic mirror device 100 as shown in FIG. 2(a), a horizontally flipped facial image 210 is displayed as a mirror image right in front of the user 200 as shown in FIG. 2(b). In FIG. 2(a), the user 200 is located in front of the central area of the display section 103, the facial image 210 is displayed in the central area of the display section 103. Also, even if the user 200 has turned to face left as shown in FIG. 3(a), the facial image 210 will also be displayed in front of the user 200 as shown in FIG. 3(b). In FIG. 3(a), the user 200 is located in front of the central area of the display section 103 and is facing left, and therefore, the facial image 210 is displayed on the left-hand side of the display section 103. As can be seen, if the facial image 210 is displayed right in the direction that the user 200 is now facing, the user 200 needs to pan his or her just a little and can look at his or her profile much more easily than when looking at him- or herself in a normal mirror. That is why since this electronic mirror device 100 includes a display location shifting section to shift the location where the facial image 210 is displayed, this electronic mirror device 100 allows the user 200 to view his or her own facial image 210 easily even if his or her face has changed its position or orientation.

The location where the facial image 210 is displayed may be shifted by making the user 200 manipulate the touchscreen panel 104 and slide his or her own facial image 210 to any location he or she likes. Alternatively, face recognition ability may be added to the electronic mirror device 100 to change the location where the facial image 210 is displayed automatically.

Figure 4:
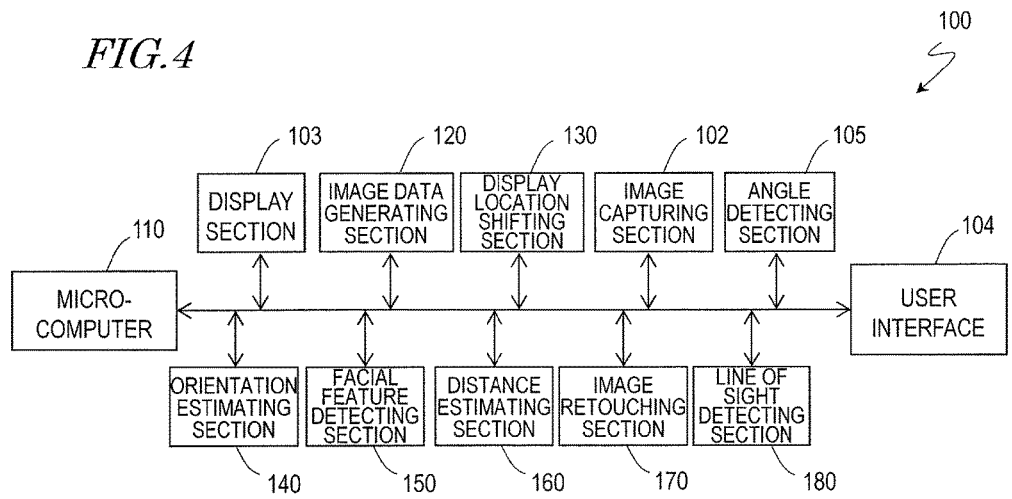
FIG. 4 A diagram showing an electronic mirror device according to an embodiment.

FIG. 4 is a block diagram illustrating respective components of the electronic mirror device 100. The electronic mirror device 100 includes the image capturing section 102, the display section 103, the user interface 104, an angle detecting section 105, a microcomputer 110, an image data generating section 120, a display location shifting section 130, an orientation estimating section 140, a facial feature detecting section 150, a distance estimating section 160, an image retouching section 170, and a line of sight detecting section 180.

The image capturing section 102 may be a CCD image sensor, for example, and captures a subject image and generates image data. In this example, the image capturing section 102 captures the user's (200) facial image and generates image data representing his or her facial image.

The image data generating section 120 generates and outputs image data representing the user's (200) facial mirror image based on the image data representing the user's (200B) facial image that has been captured. The display section 103 displays the image data 210 representing the user's (200) facial mirror image. In this example, the image to be displayed on the display section 103 is supposed to be a moving picture. However, the image may also be a still picture. The image retouching section 170 allows the user to retouch the image data representing his or her face. The angle detecting section 105 detects the angle (i.e., the degree of tilt) of the electronic mirror device 100.

The user interface 104 accepts the user's (200) instruction to shift the location where the mirror image is displayed. The user interface 104 may be a touchscreen panel, for example.

The facial feature detecting section 150 detects the location and distribution of a predetermined facial part (such as the eyes, nose or mouth) in the image data representing the user's (200) facial image. The orientation estimating section 140 estimates the user's (200) facial orientation based on the location and distribution of the predetermined facial part that has been detected. The distance estimating section 160 estimates the distance from the display section 103 to the user's (200) face. The line of sight detecting section 180 detects the direction of the user's (200) line of sight.

The display location shifting section 130 shifts the location where the mirror image is displayed on the display section 103 in accordance with the user's (200) instruction which has been entered through the user interface 104. Optionally, the display location shifting section 130 may shift the mirror image display location according to the facial orientation that has been estimated. Alternatively, the display location shifting section 130 may shift the mirror image display location according to the facial orientation and distance that have been estimated. Still alternatively, the display location shifting section 130 may shift the mirror image display location to a location to which the user 200 directs his or her line of sight.

The microcomputer 110 is a control section which controls the overall operations of the respective components of the electronic mirror device 100 described above.

It should be noted that the set of components shown in FIG. 4 is just an example and the electronic mirror device 100 does not have to include all of these components. Rather, the combination of components to be provided for the electronic mirror device 100 changes according to the intended application of the electronic mirror device 100. For example, the electronic mirror device 100 may include at least one of the user interface 104, orientation estimating section 140 and line of sight detecting section 180 which accept the user's (200) instruction to shift the display location. Also, the facial feature detecting section 150 and distance estimating section 160 are components accompanying the orientation estimating section 140, and therefore, are not indispensable ones in an embodiment that does not include the orientation estimating section 140.

Likewise, the angle detecting section 105 just needs to be provided if the electronic mirror device 100 is rotated when used as in a smartphone or tablet terminal to be described later. And the angle detecting section 105 is not an indispensable one in an embodiment in which the electronic mirror device 100 is fixed at the same angle when used.

Figure 5A:
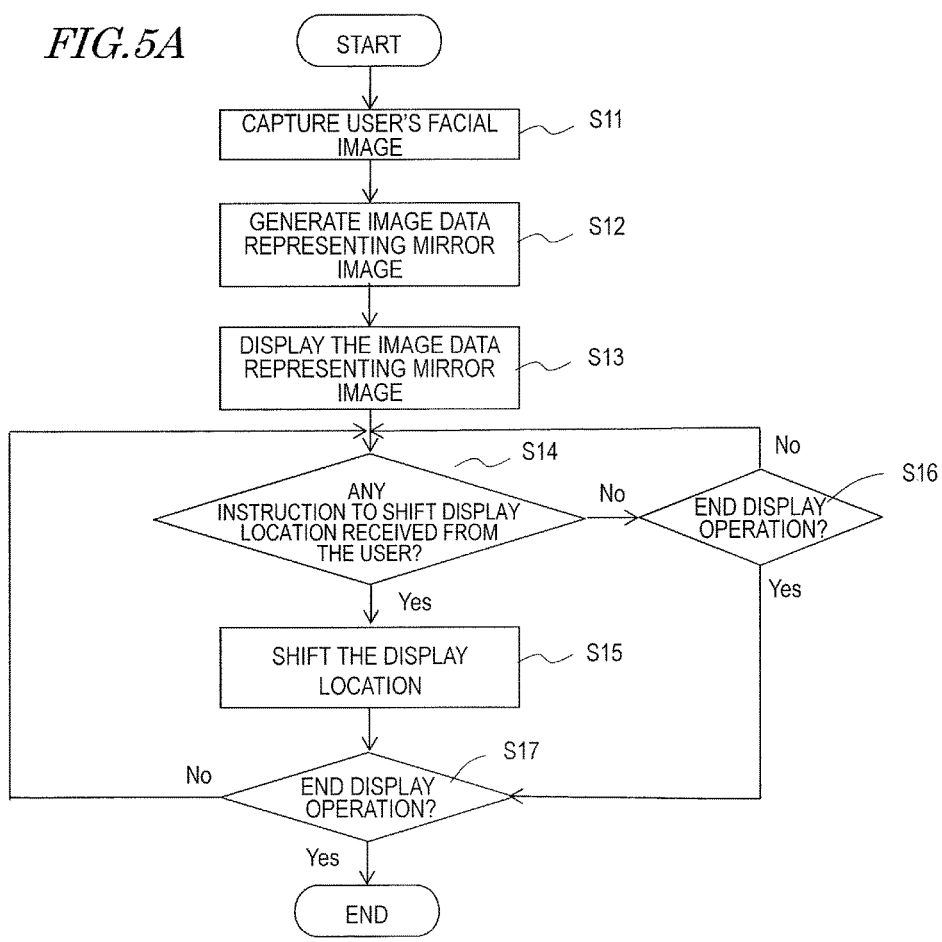
FIG. 5A A flowchart showing how an electronic mirror device according to an embodiment operates.
Figure 5C:
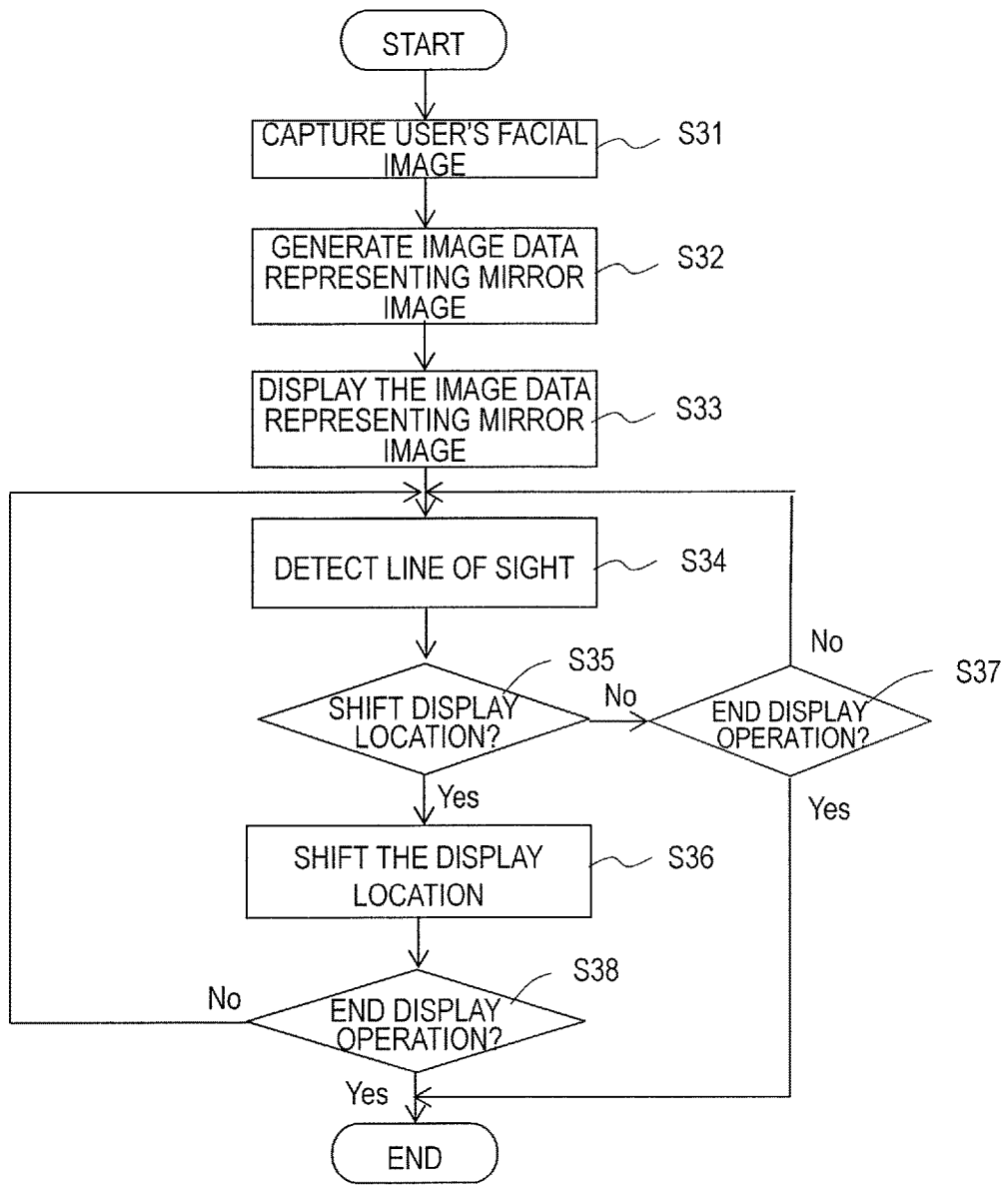
FIG. 5C A flowchart showing how an electronic mirror device according to another embodiment operates.

Next, exemplary processing of changing the location where image data representing a facial mirror image is displayed will be described. FIGS. 5A to 5C are flowcharts illustrating the processing to be carried out by the electronic mirror device 100.

FIG. 5A shows the flow of processing to be carried out in an embodiment which includes a user interface 104 that accepts the user's (200) instruction to shift the display location. When the electronic mirror device 100 starts to operate, the image capturing section 102 captures the user's (200) facial image (in Step S11) and the image data generating section 120 generates image data representing the facial mirror image (in Step S12). Then, the display section 103 displays the image data representing the mirror image thus generated (in Step S13). The user 200 checks out the image data displayed. If he or she finds it necessary to shift the display location, he or she instructs the electronic mirror device 100 to shift the display location through the user interface 104 (in Step S14). In accordance with the user's (200) instruction, the display location shifting section 130 shifts the location where the image data is displayed (in Step S15). After that, the same image will continue to be displayed until the user finishes using the electronic mirror.

Figure 6:
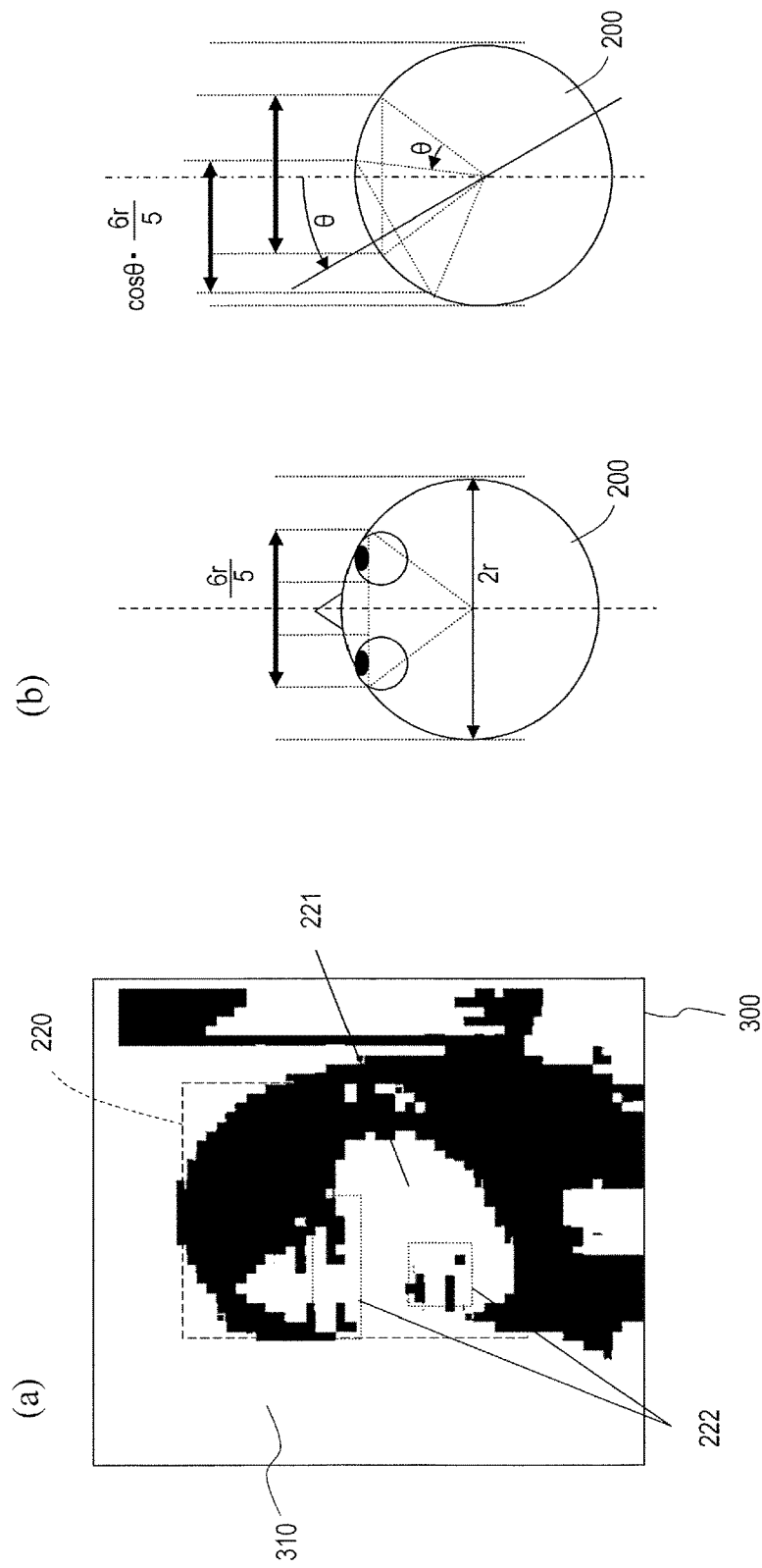
FIGS. 6 (a) and (b) illustrate how an electronic mirror device works according to an embodiment.
Figure 7:
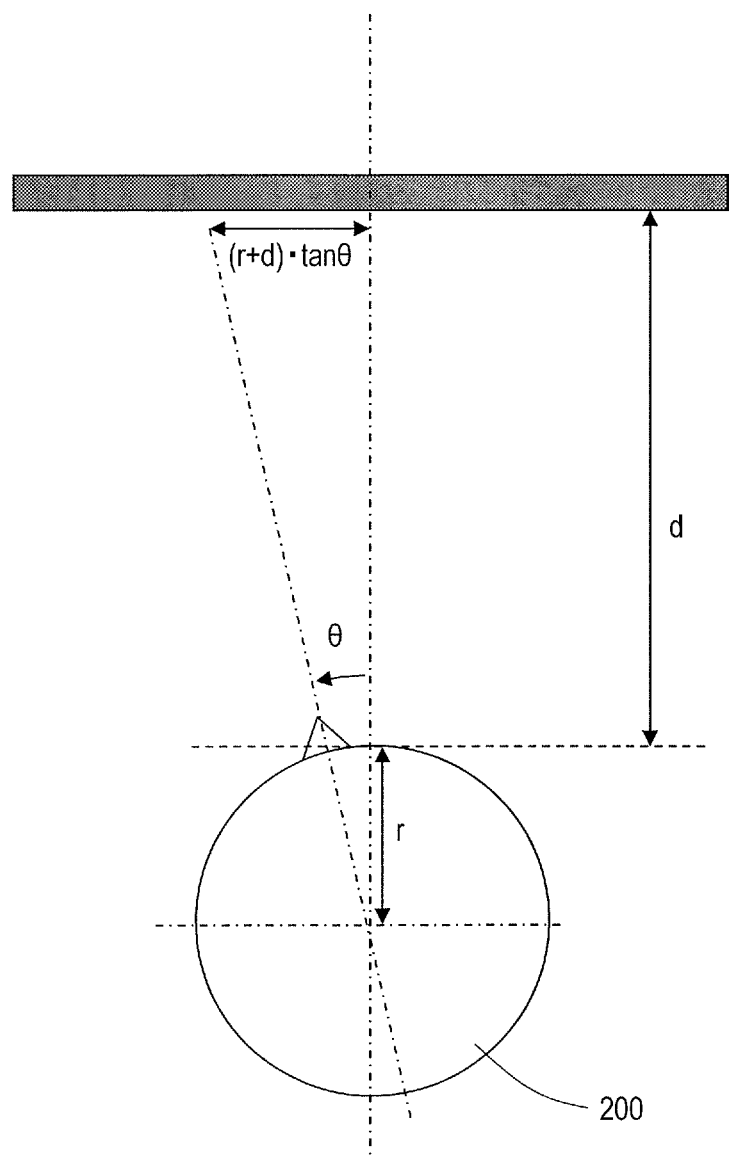
FIG. 7 Illustrates how an electronic mirror device works according to an embodiment.
Figure 8:
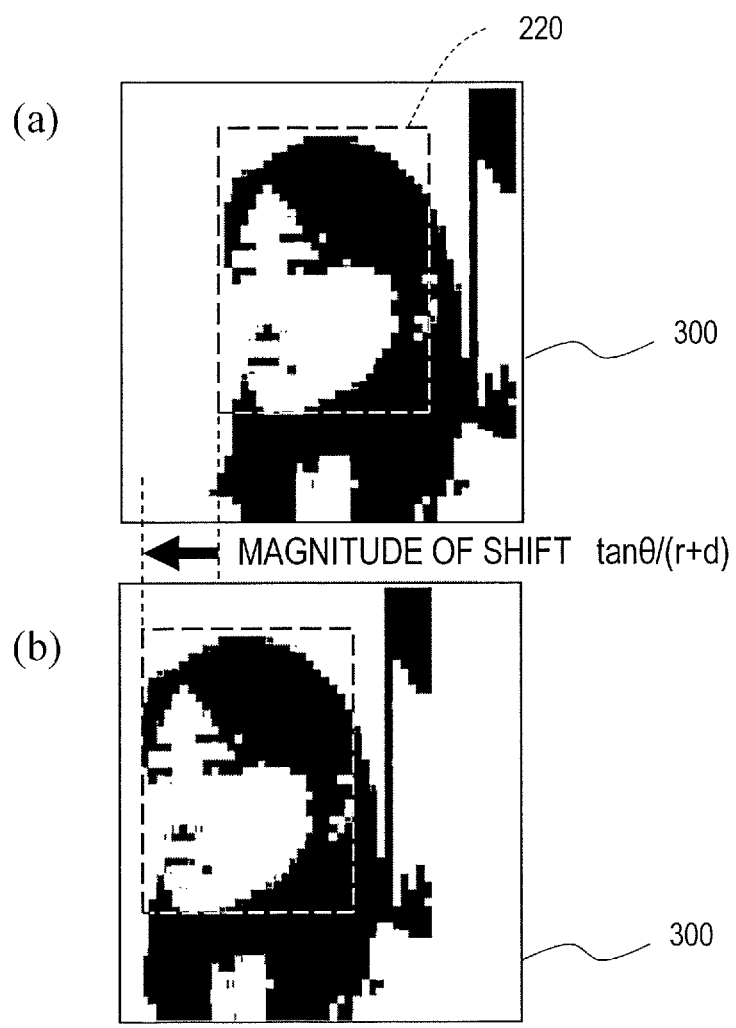
FIGS. 8 (a) and (b) illustrate how an electronic mirror device works according to an embodiment.

FIG. 5B shows the flow of processing to be carried out in an embodiment which includes the orientation estimating section 140, facial feature detecting section 150 and distance estimating section 160. FIG. 6 illustrates how the orientation estimating section 140 and facial feature detecting section 150 perform the facial orientation estimation processing. FIG. 7 illustrates how to carry out processing of determining the magnitude of shift of the display location by the facial orientation and distance that have been estimated. FIG. 8 illustrates how the facial image display location has been shifted.

The processing steps S21, S22 and S23 to be carried out until image data representing a mirror image is displayed are the same as the processing steps S11, S12 and S13 shown in FIG. 5A. Then, the orientation estimating section 140 estimates the user's (200) facial orientation θ (in Step S24). Now it will be described with reference to FIG. 6 how to estimate the facial orientation θ. The facial feature detecting section 150 detects a facial region and a non-facial region from the image 300 that has been captured by the image capturing section 102, and the orientation estimating section 140 estimates the facial orientation. For example, if a facial region 220 and a non-facial region 310 are sensed by subjecting a digitized image to pattern matching and if a bright area 221 representing the skin color region and dark areas (representing the eyes, nose, mouth and so on) 222 including feature points are detected as shown in FIG. 6(*a*), the facial orientation θ can be estimated based on the distribution of the bright area 221 and dark areas 222. Supposing the head portion has a substantially spherical shape with a radius r and the eyes are arranged at the center of the face at an interval of 6r/5 as in a simplified model shown in FIG. 6(*b*), the facial orientation θ can be obtained by calculating a trigonometric function based on the width of the dark areas in the facial region.

Next, it will be described with reference to FIGS. 7 and 8 how to determine the location where the facial image is displayed. The distance estimating section 160 determines an estimated distance d from the display section 103 to the user 200 (in Step S25). The distance may be estimated either by a method using parallax or a method which uses the angle of view of the image capturing section 102, the width of the head within the image captured, and the average width value of the head.

If the distance needs to be estimated more accurately, the distance d is determined by the parallax and the actual radius r of the user's (200) head is calculated based on the angle of view of the image capturing section 102 and the width of the head in the captured image. To measure the distance d from the display section 103 to the user 200 based on the parallax, either a method using a plurality of cameras or a method using a pupil division technique may be adopted. Up to this point, the distance d from the display section 103 to the user 200, the radius r of the user's (200) head, and the value representing the facial orientation θ have been obtained. FIG. 7 shows the relative positions of the electronic mirror device 100 and the user 200 as viewed from over them. It can be seen that if the user 200 is facing left by θ, the end of his or her straight line of sight will shift to the left on the display section 103 by (r+d)·tan θ. That is to say, if only the area 220 including the facial image is left by getting the image captured trimmed by the image retouching section 170 as shown in FIG. 8(a) and shifted to the left by (r+d)·tan θ as shown in FIG. 8(b), then the user's (200) facial image will be displayed right at the end of the user's (200) straight line of sight. As a result, the user 200 can look at his or her own right profile with his or her eyes' panning minimized.

If the display location shifting section 130 has decided to shift the display location of the facial image based on the facial orientation and distance that have been estimated, then the location where the facial image is displayed is shifted (in Steps S26 and S27). On the other hand, if the display location shifting section 130 has found it unnecessary to shift the facial image (e.g., in a situation where the user is facing forward), then the processing of estimating the facial orientation and distance is continued without changing the facial image display location (in Steps S26 and S28). After that, either the processing of estimating the facial orientation and distance or the processing of shifting the display location will be continued until the user finishes using this electronic mirror.

In the example described above, calculations are supposed to be made on the supposition that the head's radius is r for the sake of simplicity. However, the magnitude of shift of the display location may also be determined by the interval between the pupils or the width between the lateral corners of the eyes which can be easily read from the photo or image shot. Optionally, the image display location may also be adjusted by carrying out detection in the same way not only laterally across the face but also vertically or obliquely. Furthermore, it is not always necessary to provide the distance estimating section 160. Alternatively, the relation between the facial orientation and the display location may be stored in advance in a built-in memory and the display location may be determined according to the user's (200) facial orientation estimated.

FIG. 5C shows the flow of processing to be carried out in an embodiment which includes the line of sight detecting section 180. The processing steps S31, S32 and S33 to be carried out until image data representing a mirror image is displayed are the same as the processing steps S11, S12 and S13 shown in FIG. 5A.

The line of sight detecting section 180 detects the user's (200) line of sight. The method of detecting the line of sight is not particularly limited. But the line of sight may be detected by a method which uses a difference in luminance between the cornea (black part of the eye) and the sclera (white part of the eye). For example, if the decision has been made that the user 200 facing right or left, then the display location is shifted to the right or the left. On the other hand, if the decision has been made that the user 200 is facing straight forward, then the display location is not shifted (in Steps S35, S36 and S37). After that, either the line of sight detection processing or the processing of shifting the display location will be continued until the user finishes using this electronic mirror (in Steps S37 and S38).

In the embodiments shown in FIGS. 5B and 5C, the processing step S23 or S33 of displaying image data representing a mirror image before the facial orientation or line of sight is detected may be omitted. Instead the image data may be displayed after the facial orientation or line of sight has been detected. That is to say, the electronic mirror device 100 just needs to display image data representing the mirror image at a display location that has been determined based on the facial orientation or line of sight detected. Alternatively, after the facial image display location has been shifted automatically as described above, the facial image may be slid on the touchscreen panel 104 so as to be shifted finely to a location where the user 200 can view the image comfortably for him or her. Still alternatively, the microcomputer 110 may have a learning function to memorize the relation between the user's (200) facial orientation or line of sight and his or her favorite location where he or she finds it easy to use this device and store the relation in a built-in memory. Yet alternatively, the operation may also be defined so that if the magnitude of shift is too significant for the size of the electronic mirror device 100, then the facial image will be displayed well within the predetermined range of the display section 103.

This electronic mirror device 100 can display the user's (200) facial image at a location where he or she can view his or her own facial image comfortably. Consequently, he or she can view that image more easily with his or her eyes panned much less than in a normal mirror.

(Embodiment 2)

Figure 9:
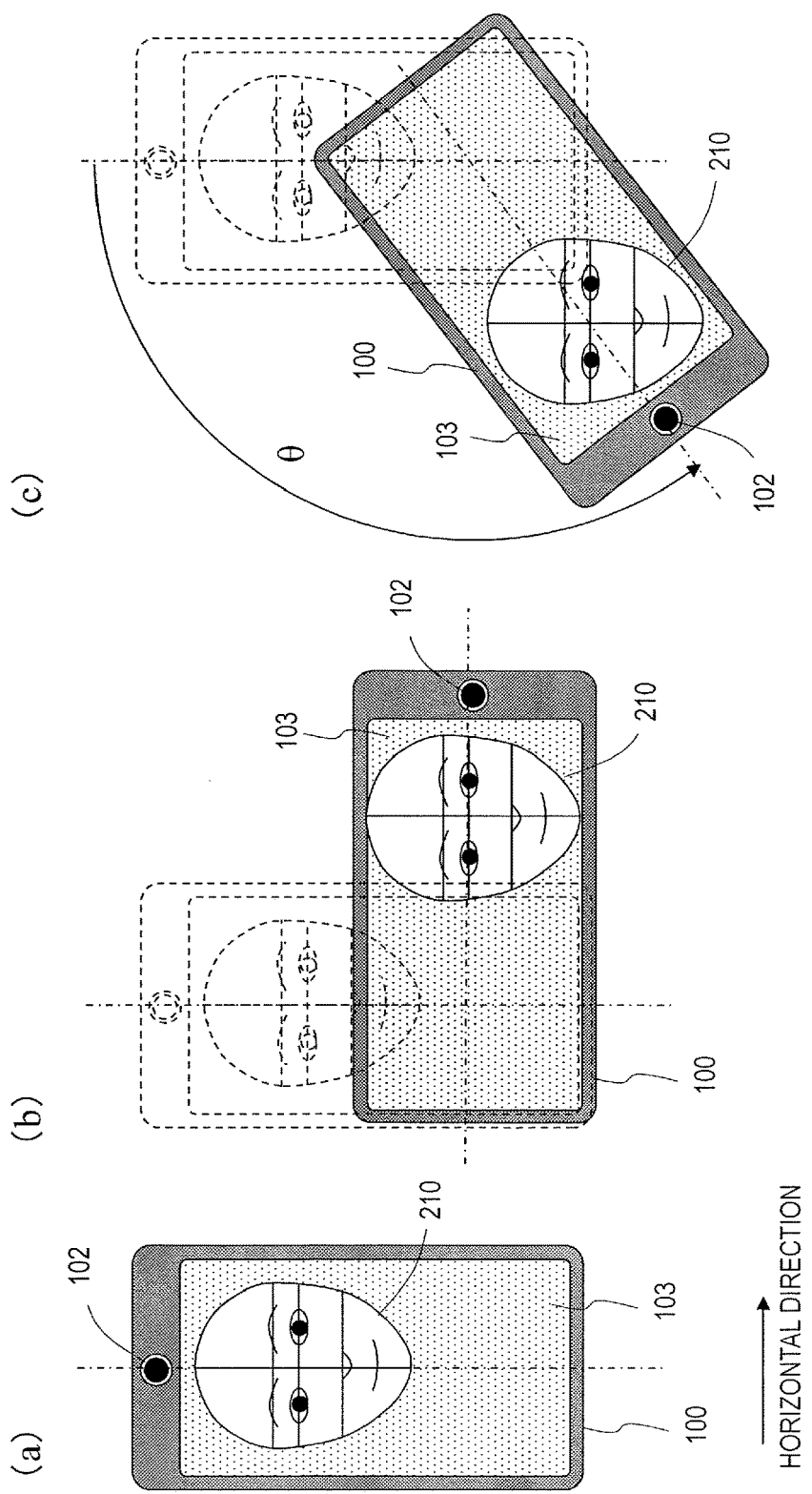
FIG. 9 (a) to (c) illustrate how an electronic mirror device works according to an embodiment.

FIG. 9 illustrates an electronic mirror device 100 as a second embodiment. The electronic mirror device 100 of this embodiment has so small a size as to be portable. The electronic mirror device 100 may be a smartphone or tablet terminal in which an application that makes the device 100 operate as an electronic mirror has been installed. In the electronic mirror device 100 of this second embodiment, the angle detecting section 105 senses how this electronic mirror device 100 is held by the user 200.

Now it will be described with reference to FIG. 9 how this electronic mirror device 100 works. Supposing a state where the electronic mirror device 100 is arranged so that its longitudinal direction is perpendicular to the horizontal direction and its image capturing section 102 is located at the top as shown in FIG. 9(a) is a reference state, the facial image 210 is displayed in the upper area of the display section 103 because the closer to the image capturing section 102 the user's (200) eye level is, the more easily he or she can view the image. That is to say, in an initial state before the display location shifting section 130 shifts the location where the facial image 210 is displayed, the facial image 210 is displayed at such a location that is closer to the image capturing section 102 than to the central area of the display section 103.

Next, if the electronic mirror device 100 has been rotated 90 degrees to the right as shown in FIG. 9(b), the angle detecting section 105 senses that 90 degree rotation to the right, and the facial image 210 rotates 90 degrees to the left and is displayed at a location that is close to the image capturing section 102. In the same way, if the electronic mirror device 100 has been rotated θ degrees to the left as shown in FIG. 9(c), the angle detecting section 105 senses that θ degree rotation to the left, and the facial image 210 rotates θ degrees to the right and is displayed at a location that is close to the image capturing section 102.

Just like the electronic mirror device 100 of the first embodiment described above, the electronic mirror device 100 of this second embodiment can also shift the location where the facial image 210 is displayed. In addition, the electronic mirror device 100 of the second embodiment is a portable one of so small a size that the relative positions of the user 200, the image capturing section 102 and display section 103 can be changed easily.

Figure 11:
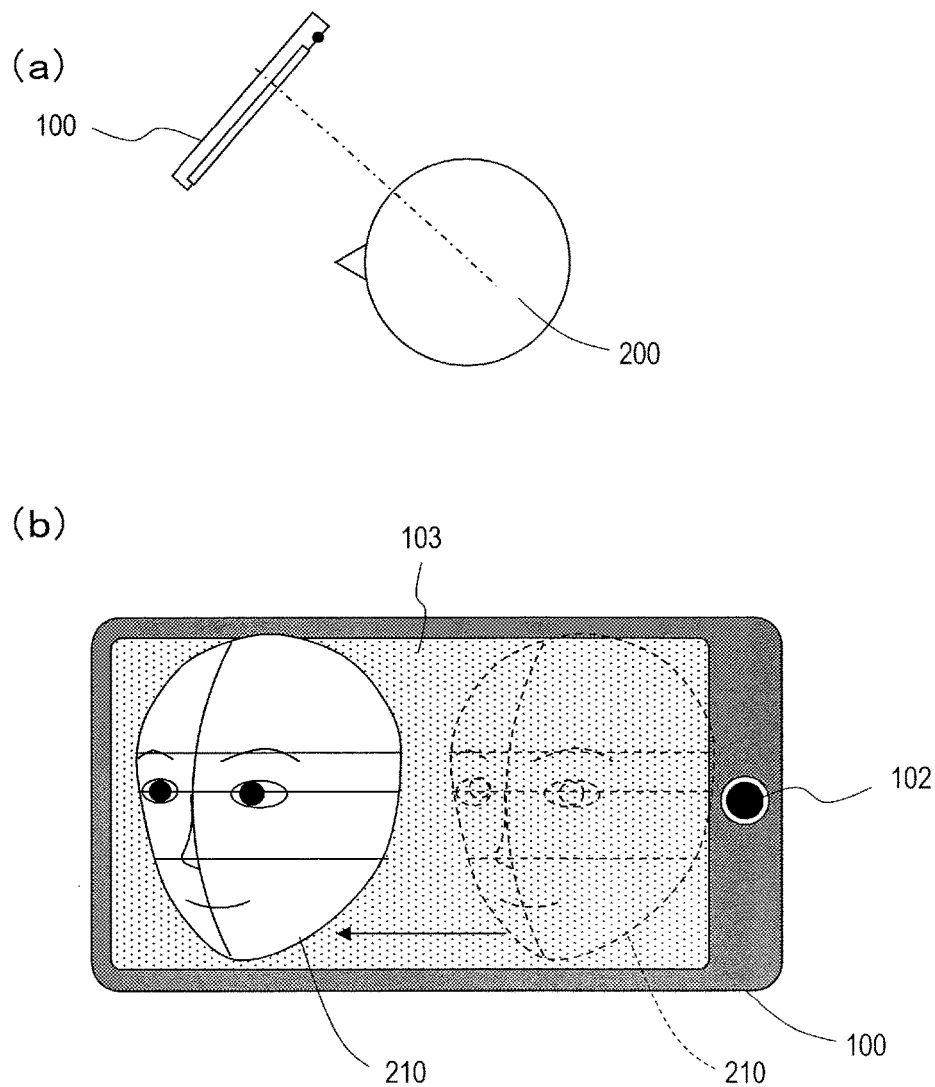
FIGS. 11 (a) and (b) illustrate how an electronic mirror device works according to an embodiment.

Next, it will be described in further detail with reference to FIGS. 10 and 11 how the electronic mirror device 100 of this second embodiment works. FIGS. 10(a) and 11(a) illustrate the relative positions of the electronic mirror device 100 and the user 100 when viewed from over them, while FIGS. 10(b) and 11(b) illustrate the image displayed on the electronic mirror device 100 in such situations. In a situation where the user 200 is facing squarely toward the electronic mirror device 100 as shown in FIG. 10(a), even if the user 200 is viewing the display section 103 straight, the facial image 210 captured will be a slightly angled one as viewed from the right-hand side, because the image capturing section 102 is located on the right-hand side of the user 200. Such a deviation of the line of sight is usually regarded as one of problems with an electronic mirror. However, such a deviation can rather be taken advantage of effectively if the user does want to get information about his or her profile on the right-hand side as in this embodiment. More specifically, if the user wants to view his or her profile on the right-hand side closely as shown in FIG. 11(a), he or she just needs to bring the image capturing section 102 closer to the facial region he or she wants to check out with the image capturing section 102 arranged on the right hand side of the display section 103. Then, he or she will be sensed to be facing left. As a result, the facial image 210 will shift leftward on the display section 103 to a location where the user 200 can view the image comfortably as shown in FIG. 11(b). The same can be said about not only laterally across the face but also vertically or obliquely as well. For example, if the user wants to get information about his or her profile on the left-hand side, the location where the facial image 210 is displayed just needs to be shifted to the right with the image capturing section 102 arranged on the left-hand side. Then, the facial image 210 will be displayed at a location where the user 200 can view it comfortably.

It should be noted that not the entire facial image has to be displayed on the display section 103 but only a particular part of the face the user wants to view may be displayed there. The location where the facial image 210 is displayed may be shifted either manually or by automatic face detection function as in the first embodiment described above. Alternatively, after the location where the facial image 210 is displayed has been shifted automatically, the facial image 210 may be slid on the touchscreen panel 104 so as to be shifted finely to a location where the user 200 can view the image comfortably for him or her. However, in the small and portable electronic mirror device 100 of this second embodiment, the magnitude of shift of the image location is limited by the size of the display section 103. For example, if the display section 103 is that of a smartphone with a longitudinal size of 100 mm, the display section 103 is so small that the user 200 is expected to view this electronic mirror device 100 from a distance of approximately 200 nm in order to view the image comfortably. As a grownup male or female usually has a head width of about 150 mm on average, the facial orientation at which the magnitude of shift of the image becomes smaller than 100 mm that is the size of the display section becomes equal to or smaller than 20 degrees which satisfies 100<tan θ·(75+200). If the user wants to view a particular part of his or her face such as around his or her ears or under his or her chin with his or her facial orientation changed by 20 degrees or more, then the magnitude of shift will be too large for the size of the electronic mirror device 100 to prevent the image from falling out of the intended display area. For that reason, the operation may be defined so that the facial region image will be displayed within the predetermined range of the display section 103.

According to this second embodiment, when the user 200 who is using the small and portable electronic mirror device 100 arranges the image capturing section 102 close to a facial part he or she wants to view, his or her facial orientation will be detected and his or her facial image captured will be shifted to, and displayed at, a location which is away from the image capturing section 102. As a result, the facial image can be displayed at a location where the user 200 can view the image comfortably. That is to say, the user 200 can view the facial image more easily with his or her eyes panned much less than in a normal mirror.

(Embodiment 3)

An electronic mirror device 100 as a third embodiment will be described with reference to FIGS. 12 through 15.

FIG. 12(a) is a top view of an electronic mirror device 100 according to this third embodiment, and FIG. 12(b) is a plan view illustrating the electronic mirror device 100 of the third embodiment as viewed in front of its display section 103. In the electronic mirror device 100 of this third embodiment, the display section 103 has a plurality of planes. For example, the electronic mirror device 100 has three display sections 103L, 103C and 103R. The image capturing section 102 forms part of one of those display sections (e.g., the display section 103C). Also, the line of sight detecting section 180 detects the direction of the user's (100) line of sight. The method of detecting the line of sight is not particularly limited. But the line of sight may be detected by a method which uses a difference in luminance between the cornea (black part of the eye) and the sclera (white part of the eye), for example.

FIGS. 12(a) and 12(b) illustrate a configuration which has three flat display planes like a three-sided mirror. These three display planes will be hereinafter referred to as display sections 103L, 103C and 103R from left to right, respectively, for the sake of simplicity. The image captured by the image capturing section 102 is displayed on any of the display sections 103L, 103C and 103R. The display location shifting section 130 shifts the display location of the facial image 210 from one of these display sections 103L, 103C and 103R to another according to the user's (200) facial orientation.

Figure 13:
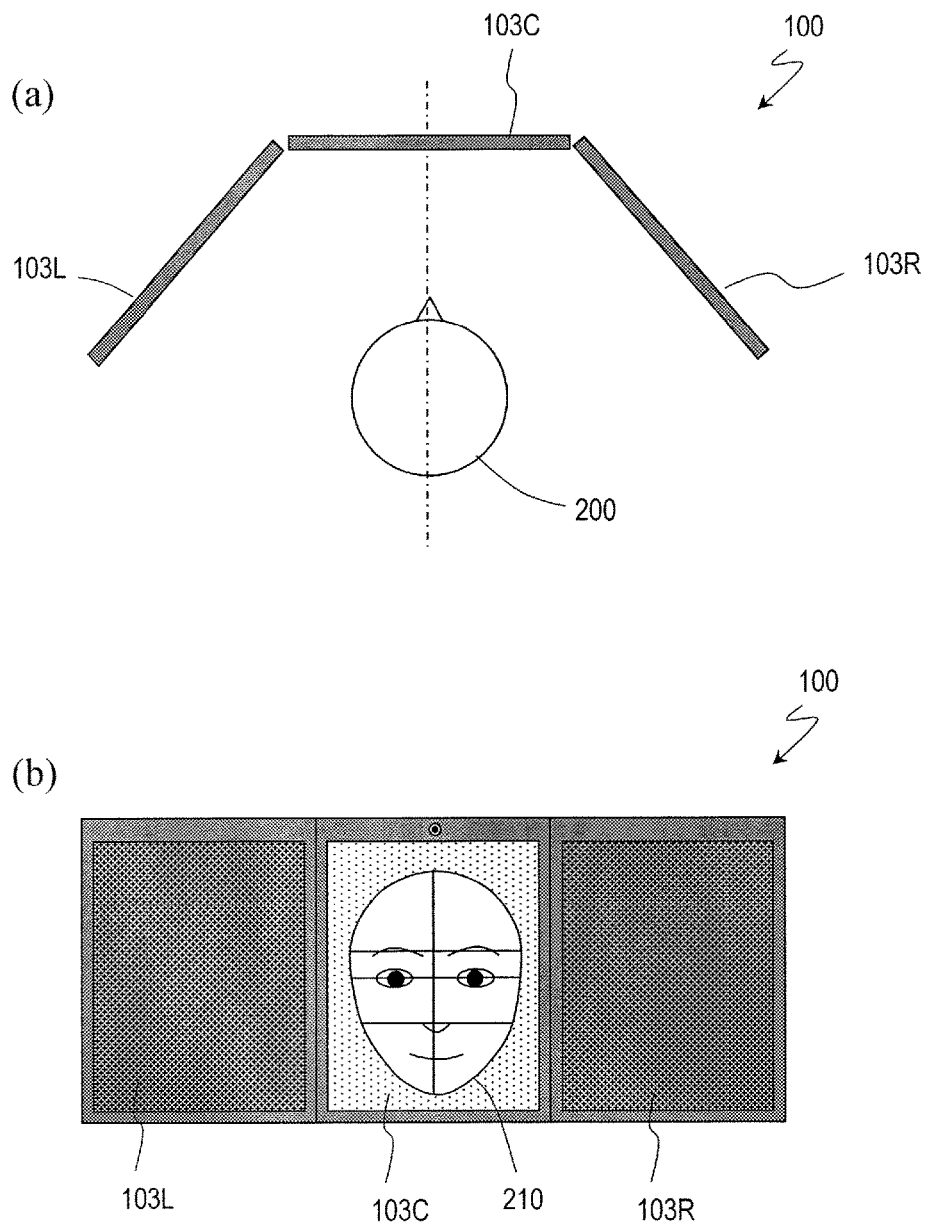
FIGS. 13 (a) and (b) illustrate how an electronic mirror device works according to an embodiment.
Figure 14:
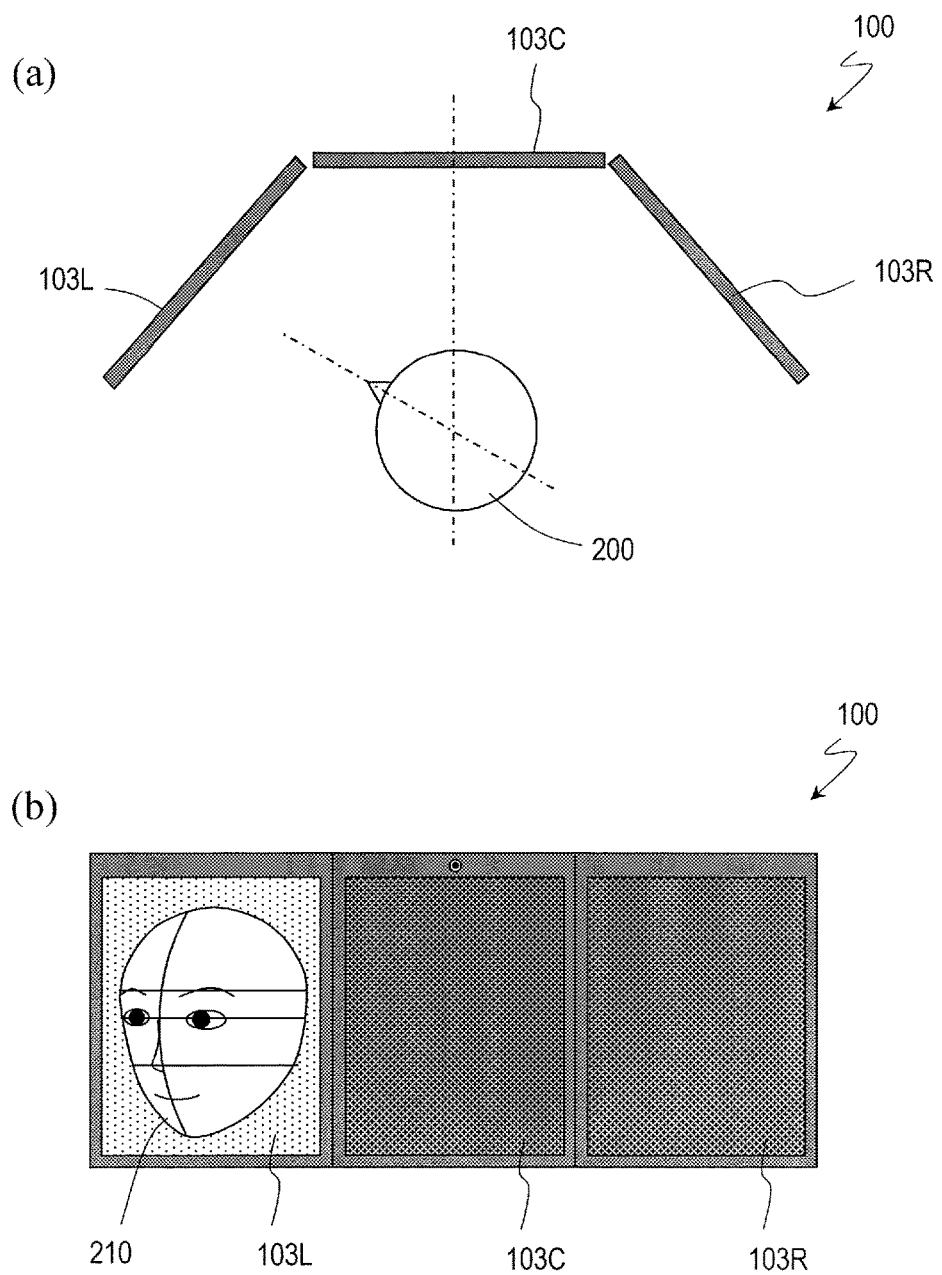
FIGS. 14 (a) and (b) illustrate how an electronic mirror device works according to an embodiment.

FIGS. 13 to 15 illustrate how the electronic mirror device 100 of this third embodiment works. FIGS. 13(a), 14(a) and 15(a) show relative positions of the electronic mirror device 100 and the user 200 as viewed from over them. On the other hand, FIGS. 13(b), 14(b) and 15(b) each illustrate a facial image 210 to be displayed on the electronic mirror device 100 when they are located at those relative positions.

If the user 200 is facing straight forward and directing his or her line of sight toward the display section 103C as shown in FIG. 13(a), the image of the user 200 captured by the image capturing section 102 will be displayed as a horizontally flipped facial mirror image 210 on the display section 103C as shown in FIG. 13(b). On the other hand, if the user 200 has turned to face left and is now directing his or her line of sight toward the display section 103L as shown in FIG. 14(a), the image of the user 200 captured by the image capturing section 102 will shift to, and be displayed on, the display section 103L as shown in FIG. 14(b). Likewise, if the user 200 has turned to face right and is now directing his or her line of sight toward the display section 103R, the image of the user 200 captured by the image capturing section 102 will shift to, and be displayed on, the display section 103R. Furthermore, if the user 200 has changed the direction of his or her line of sight to direct it toward the display section 103C while facing left as shown in FIG. 15(a), the image of the user 200 captured by the image capturing section 102 will shift to, and be displayed on, the display section 103C as shown in FIG. 15(b).

To determine the display location, the angle formed between the display sections 103L and 103C and the angle formed between the display sections 103C and 103R need to be detected in advance. That is why if the angle can be adjusted in multiple stages, the electronic mirror device 100 may include a sensor which senses the angles formed between those pairs of display sections. Alternatively, the electronic mirror device 100 may include a user interface which allows the user 200 to adjust the display location of the facial image to any location he or she likes.

In the third embodiment described above, the electronic mirror device 100 is supposed to include three flat display planes. However, the display sections 103 do not have to be flat but a flexible display with a curved surface may also be used. If such a curved display screen is adopted, the image to be displayed needs to be retouched according to the curvature of the display screen so as to look as natural to the viewer's eye as possible.

According to the third embodiment, by displaying the user's (200) facial image at the end of his or her line of sight, he or she can view easily his or her facial image, even from an angle from which he or she could not look at him- or herself in a normal mirror, with his or her eyes panned just a little.

In the foregoing description of the first to third embodiments, a touchscreen panel which senses a touch manipulation by the user 200 is supposed to be used as an exemplary user interface 104. However, this is only an example of the present disclosure. Alternatively, the user interface 104 may also receive the user's (200) instruction by detecting his or her gesture or sign. Still alternatively, the user interface 104 may also receive the user's (200) audio instruction by recognizing his or her voice. Yet alternatively, the user interface 104 may even be buttons such as cursor keys.

The processing by the respective components of the electronic mirror device 100 described above may be carried out at least partially by the microcomputer 110. For example, the microcomputer 110 may have the functions of the image data generating section 120, display location shifting section 130, orientation estimating section 140, facial feature detecting section 150, distance estimating section 160, image retouching section 170, and line of sight detecting section 180 and may perform their operations.

Also, the operation of the electronic mirror device 100 described above may be carried out either by hardware circuits or by executing a software program. A computer program which is designed to get such an operation done may be stored in a memory built in the microcomputer 110. Also, such a computer program may be installed from a storage medium (such as an optical disc or a semiconductor memory) in which the program is stored into the electronic mirror device 100 or downloaded through a telecommunications line such as the Internet. Alternatively, the electronic mirror operation described above may also be performed by installing such a computer program in an electronic device such as a smartphone or a tablet terminal.

INDUSTRIAL APPLICABILITY

The technique of the present disclosure can be used particularly effectively in the field of electronic mirrors.

REFERENCE SIGNS LIST

100 electronic mirror device
101 housing
102 image capturing section
103, 103L, 103C, 103R display section
104 user interface
105 angle detecting section
110 microcomputer
120 image data generating section
130 display location shifting section
140 orientation estimating section
150 facial feature detecting section
160 distance estimating section
170 image retouching section
180 line of sight detecting section
200 user
210 facial image

The invention claimed is:

1. An electronic mirror device which displays a user's facial mirror image, the device comprising:
    an image capturing section which captures the user's facial image;
    an image data generating section which outputs image data representing the user's facial mirror image based on image data representing the user's facial image that has been captured;
    a display section which displays the image data representing the user's facial mirror image;
    an orientation estimating section which estimates the user's facial orientation; and
    a display location shifting section which shifts a location where the mirror image is displayed on the display section, wherein the display location shifting section shifts the location where the mirror image is displayed according to the facial orientation that has been estimated, and wherein the shifted mirror image is a real-time mirrored image of the user.

2. The electronic mirror device of claim 1, further comprising a user interface which accepts the user's instruction to shift the location where the mirror image is displayed,
    wherein the display location shifting section shifts the location where the mirror image is displayed in accordance with the user's instruction.

3. The electronic mirror device of claim 1, further comprising a facial feature detecting section which detects a location and a distribution of a predetermined facial part of the image data representing the user's facial image,
    wherein the orientation estimating section estimates the user's facial orientation based on the location and the distribution of the predetermined facial part that has been detected.

4. The electronic mirror device of claim 1, further comprising a distance estimating section which estimates a distance from the display section to the user's face,
    wherein the display location shifting section shifts the location where the mirror image is displayed according to the facial orientation and distance that have been estimated.

5. The electronic mirror device of claim 1, wherein the image capturing section and the display section form integral parts of the device.

6. The electronic mirror device of claim 1, wherein before the display location shifting section shifts the location where the mirror image is displayed, the image data is displayed closer to the image capturing section than to a central area of the display section.

7. The electronic mirror device of claim 1, comprising a plurality of the display sections,
    wherein the display location shifting section shifts the location where the mirror image is displayed from one of the plurality of display section to another.

8. The electronic mirror device of claim 1, wherein the shifted mirror image is a mirror image of the user's entire face.

9. An electronic mirror device which displays a user's facial mirror image, that device comprising:
- an image capturing section which captures the user's facial image;
- an image data generating section which outputs image data representing the user's facial mirror image based on image data representing the user's facial image that has been captured;
- a display section which displays the image data representing the user's facial mirror image;
- a line of sight detecting section which detects the direction of the user's line of sight; and
- a display location shifting section which shifts a location where the mirror image is displayed on the display section, wherein the display location shifting section shifts the location where the mirror image is displayed to a location to which the user currently directs his or her line of sight, and wherein the shifted mirror image is a real-time mirrored image of the user.

10. A non-transitory computer-readable medium storing a computer program which is defined to make an electronic device perform an operation of displaying a user's facial mirror image, the operation comprising the steps of:
- capturing the user's facial image;
- outputting image data representing the user's facial mirror image based on image data representing the user's facial image that has been captured;
- displaying the image data representing the user's facial mirror image;
- estimating the user's facial orientation; and
- shifting a location where the mirror image is displayed, wherein the location where the mirror image is displayed is shifted according to the facial orientation that has been estimated, and wherein the shifted mirror image is a real-time mirrored image of the user.

* * * * *